United States Patent
Zhong

(10) Patent No.: US 9,857,637 B2
(45) Date of Patent: Jan. 2, 2018

(54) PIXEL ELECTRODE AND LIQUID CRYSTAL DISPLAY PANEL

(71) Applicant: Shenzhen China Star Optoelectronics Technology Co., Ltd., Shenzhen (CN)

(72) Inventor: Xinhui Zhong, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 250 days.

(21) Appl. No.: 14/777,743

(22) PCT Filed: Jul. 24, 2015

(86) PCT No.: PCT/CN2015/085090
§ 371 (c)(1),
(2) Date: Sep. 16, 2015

(87) PCT Pub. No.: WO2016/206155
PCT Pub. Date: Dec. 29, 2016

(65) Prior Publication Data
US 2017/0146866 A1    May 25, 2017

(30) Foreign Application Priority Data
Jun. 25, 2015 (CN) .......................... 2015 1 0358119

(51) Int. Cl.
*G02F 1/1337* (2006.01)
*G02F 1/1343* (2006.01)
(Continued)

(52) U.S. Cl.
CPC ...... *G02F 1/134309* (2013.01); *G02F 1/1368* (2013.01); *G02F 1/13439* (2013.01);
(Continued)

(58) Field of Classification Search
None
See application file for complete search history.

(56) References Cited

U.S. PATENT DOCUMENTS

2012/0307190 A1* 12/2012 Zhang ............... G02F 1/133707
349/142

FOREIGN PATENT DOCUMENTS

CN    102193256 A    9/2011

* cited by examiner

*Primary Examiner* — Richard Kim
(74) *Attorney, Agent, or Firm* — Leong C. Lei

(57) ABSTRACT

The present invention provides a pixel electrode and a liquid crystal display panel. In the liquid crystal display panel of the present invention, by locating the main parts to be elbow bend zigzag structures to make the liquid crystal molecules of the main electrode position be aligned along a tilt 45 degrees direction as possible, the active area is enlarged to solve the issue that the penetration rate is low because the liquid crystal molecules at the structure of the (cross) keel of pozidriv pixel electrode fall down toward the improper directions, to raise the penetration rate for reducing the demand to the backlight brightness of the liquid crystal display panel and lowering the cost and the usage power consumption. In the liquid crystal display panel of the present invention, of which the main parts of the pixel electrode utilizes the elbow bend zigzag structures, the penetration rate is higher, and the demand to the backlight brightness is lower, and the usage power consumption is lower.

4 Claims, 9 Drawing Sheets

(51) Int. Cl.
*G02F 1/1368* (2006.01)
*G02F 1/1362* (2006.01)
(52) U.S. Cl.
CPC .. *G02F 1/136286* (2013.01); *G02F 2201/121* (2013.01); *G02F 2201/123* (2013.01)

PIXEL ELECTRODE AND LIQUID CRYSTAL DISPLAY PANEL

FIELD OF THE INVENTION

The present invention relates to a display technology field, and more particularly to a pixel electrode and a liquid crystal display panel.

BACKGROUND OF THE INVENTION

In recent years, the Thin Film Transistor-LCD (TFT-LCD) has been rapidly developed and applied widely. For the TFT-LCD in the mainstream market, three types, which respectively are Twisted Nematic (TN), Super Twisted Nematic (STN), In-Plane Switching (IPS) and Vertical Alignment (VA) can be illustrated. The VA liquid crystal display possesses extremely high contrast than the liquid crystal displays of other types, which can reach up to 4000-8000 in general. It has very wide application in large scale display, such as television or etc.

The reason why the VA liquid crystal display possesses extremely high contrast is that the liquid crystal molecules are vertically aligned to the substrate surface, and no phase difference exists, and light leakage is very small, and the dark state brightness is extremely small at the dark state without applying electricity. The lower the brightness at the dark state can be, the higher the contrast is according to the contrast calculation formula. For vertically aligning the liquid crystal molecules of the VA liquid crystal display to the substrate surface, it is demanded to implement vertical alignment treatment to the liquid crystal molecules. The most common way is to coat vertical alignment solution on specific areas of surfaces of the upper, lower substrates, and the alignment solution generally comprises a large amount of chemical solution NMP (N-methylpyrrolidone) and Polyimide (PI), and then to bake the substrates for a long period at high temperature (generally above 200 degrees) for curing the solvent in the alignment solution. Thus, PI alignment layers are formed on the surfaces of the substrates. As shown in FIG. 1, the traditional VA liquid crystal display comprises an upper glass substrate 100, a lower glass substrate 200 oppositely located to the upper glass substrate 100, a liquid crystal layer 400 sandwiched between the upper glass substrate 100 and the lower glass substrate 200, PI alignment layers 300 formed on a surface of the upper glass substrate 100 facing to the glass substrate 200 and a surface of the lower glass substrate 200 facing to the upper glass substrate 100. However, because the VA liquid crystal display utilizes vertical twist liquid crystals and the birefraction difference of the liquid crystal molecules is larger, the issue of the color shift under large view angle is more serious.

For earning better wide view angle property for the VA liquid crystal display panel to improve the color shift issue, the multi-domain VA (MVA) technology is commonly utilized, which is to divide a sub pixel into many districts and drive the liquid crystals in respective districts to lie down toward different directions as applying voltage. Thus, the watch results from respective directions can be equal. There are many methods for realizing the MVA technology. Please refer to FIG. 2, FIG. 3 and FIG. 4. One of the methods is to process onside of the ITO pixel electrode 520 to be a pozidriv pattern. The common electrode 510 is a plane electrode which has uniform thickness and is uninterruptedly continuous. With the special ITO pixel electrode pattern, the tilt electric field can induce the liquid crystal molecules 400 to fell down toward different directions.

FIG. 2 is a top view diagram of one side of a lower substrate 20 in an MVA type liquid crystal display panel. 610 and 620 respectively are a scan line and a data line. The ITO pixel electrode 520 comprises a (cross) keel 511 as being a main piece and a pattern of pixel electrode branches 512 respectively extending in directions of 45°, 135°, −45° and −135° from the (cross) keel 511 relative to the horizontal direction with spaced slits. FIG. 3 is a sectional diagram of an MVA type liquid crystal display panel corresponding to A-A portion shown in FIG. 2. The pixel electrode 520 with slits is positioned on the flat lower passivation layer 600. The plane common electrode 510 is positioned on the flat upper passivation layer 600. The PI alignment layers 300 cover on the pixel electrode 520 and the common electrode 510.

According to the transmittance formula of the VA liquid crystal display panel:

$$T = \frac{1}{2}\sin^2 2\Delta\Phi \sin^2 \frac{\Gamma}{2}, \quad (1)$$

wherein T is the penetration rate, and Δϕ is the included angle between the long axis of the liquid crystal and the polarizer, of which the efficiency is the maximum as the angle is 45°; Γ is the phase difference, i.e. the modulation result to the polarized light with the liquid crystal molecules driven by the electrical field.

The calculation formula of Γ is:

$$\Gamma = \cos(a) * 2\pi * \Delta n * d/\lambda \quad (2)$$

wherein a is the included angle between the long axis of the liquid crystal and the normal line of the substrate, and the volume is determined according to the electrical fielding affecting the liquid crystal molecules, and d is the cell gap, and Δn is the refractivity difference of the long, short axes of the liquid crystal.

According to the penetration rate formula, in the four areas of the sub pixel, the pixel electrode 520 comprises a pattern of pixel electrode branches 512 respectively extending in directions of 45°, 135°, −45° and −135° relative to the horizontal direction with spaced slits (the direction of the upper, lower polarizers respectively are 0°, 90°. The long axes of the liquid crystal molecules will respectively fell down toward the directions of 45°, 135°, −45° and −135° relative to the horizontal direction. In the penetration rate formula $\sin^2 2\Delta\Phi = 1$, the maximization of the penetration rate can be achieved.

However, the liquid crystal molecules 400 in the area corresponding to the (cross) keel 511 of the pixel electrode 520 as shown in FIG. 2 always cannot fell down as that the liquid crystal molecules in the areas corresponding to the pattern of the pixel electrode branches 512 with spaced slits fell down toward the directions of 45°, 135°, −45° and −135° relative to the horizontal direction. Thus, as shown in FIG. 4, the liquid crystal molecules 400 in the area corresponding to the (cross) keel 511 tilt toward 0° or fell down toward 90° to make $\sin^2 2\Delta\Phi = 0$ in the penetration rate formula. The display is in an opaque state to cause the entire penetration rate of the liquid crystal display panel to descend.

SUMMARY OF THE INVENTION

An objective of the present invention is to provide a pixel electrode, capable of solving the issue that the penetration rate is low because a portion of liquid crystal molecules at the main piece of pozidriv pixel electrode fall down toward the improper directions, to raise the penetration rate for reducing the demand to the backlight brightness of the liquid crystal display panel and lowering the cost and the usage power consumption.

Another objective of the present invention is to provide a liquid crystal display panel, of which the main parts of the pixel electrode utilizes the elbow bend zigzag structures, the penetration rate is higher, and the demand to the backlight brightness is lower, and the usage power consumption is lower.

For realizing the aforesaid objectives, the present invention provides a pixel electrode, comprising a first main electrode, and a second main electrode orthogonally cross with the first main electrode, and a plurality of branch electrodes connected with the first main electrode and the second main electrode;

both the first main electrode and the second main electrode appear to be a continuous elbow bend zigzag;

the first main electrode and the second main electrode separate the plurality of branch electrodes into first, second, third and fourth regions arranged along the clockwise direction;

in the first region, one sides of the first main electrode and the second main electrode close to the first region are respectively connected with a plurality of first branch electrodes;

in the second region, one sides of the first main electrode and the second main electrode close to the second region are respectively connected with a plurality of second branch electrodes;

in the third region, one sides of the first main electrode and the second main electrode close to the third region are respectively connected with a plurality of third branch electrodes;

in the fourth region, one sides of the first main electrode and the second main electrode close to the fourth region are respectively connected with a plurality of fourth branch electrodes;

the first, second, third, fourth branch electrodes are respectively tilted of 135°, 45°, −45° and −135° relative to an extending direction of the second main electrode.

The first main electrode comprises a plurality of first electrode sections, and a plurality of second electrode sections orthogonal with and connected to the first electrode sections end to end;

the second main electrode comprises a plurality of third electrode sections, and a plurality of fourth electrode sections orthogonal with and connected to the third electrode sections end to end, and the third electrode sections and the first electrode sections are parallel, and the fourth electrode sections and the second electrode sections are parallel;

joints of the plurality of the first electrode sections and the plurality of second electrode sections respectively form first bending parts on the first main electrode; joints of the plurality of the third electrode sections and the plurality of fourth electrode sections respectively form second bending parts on the second main electrode.

In the first region, one sides of the first electrode sections, third electrode sections close to the first region are orthogonally connected with one first branch electrode, respectively, and the first branch electrode is connected with the first bending part or the second bending part;

in the second region, one sides of the second electrode sections, fourth electrode sections close to the second region are orthogonally connected with one second branch electrode, respectively, and the second branch electrode is connected with the first bending part or the second bending part;

in the third region, one sides of the first electrode sections, third electrode sections close to the third region are orthogonally connected with one third branch electrode, respectively, and the third branch electrode is connected with the first bending part or the second bending part;

in the fourth region, one sides of the second electrode sections, fourth electrode sections close to the fourth region are orthogonally connected with one fourth branch electrode, respectively, and the fourth branch electrode is connected with the first bending part or the second bending part.

The first electrode sections of the first main electrode in a middle region are commonly shared with the second main electrode, and replace the third electrode sections of the second main electrode in the middle region.

In the first region, one sides of the first electrode sections, third electrode sections close to the first region are orthogonally connected with two first branch electrodes, respectively, and one of the first branch electrodes is connected with the first bending part or the second bending part, and the other is connected with a middle part of the first electrode section or the third electrode section;

in the second region, one sides of the second electrode sections, fourth electrode sections close to the second region are orthogonally connected with two second branch electrodes, respectively, and one of the second branch electrodes is connected with the first bending part or the second bending part, and the other is connected with a middle part of the second electrode section or the fourth electrode section;

in the third region, one sides of the first electrode sections, third electrode sections close to the third region are orthogonally connected with two third branch electrodes, respectively, and one of the third branch electrodes is connected with the first bending part or the second bending part, and the other is connected with the middle part of the first electrode section or the third electrode section;

in the fourth region, one sides of the second electrode sections, fourth electrode sections close to the fourth region are orthogonally connected with two fourth branch electrodes, respectively, and one of the fourth branch electrodes is connected with the first bending part or the second bending part, and the other is connected with a middle part of the second electrode section or the fourth electrode section.

The first electrode sections of the first main electrode in a middle region orthogonally cross with the fourth electrode sections of the second main electrode in the middle region, and foot points respectively are middle points of the first electrode sections and the fourth electrode sections.

A plurality of first, second, third, fourth electrode gaps are formed among the plurality of first, second, third, fourth branch electrodes; widths of the first, second, third, fourth electrode gaps are the same; included angles between the first, second, third, fourth electrode gaps and extending directions of the first main electrode and the second main electrode are 45 degrees.

Widths of the first, second, third, fourth electrode sections and widths of the first, second, third, fourth branch electrodes are the same.

Material of the pixel electrode is ITO.

The present invention further provides a pixel electrode, comprising a first main electrode, and a second main electrode orthogonally cross with the first main electrode, and a plurality of branch electrodes connected with the first main electrode and the second main electrode;

both the first main electrode and the second main electrode appear to be a continuous elbow bend zigzag;

the first main electrode and the second main electrode separate the plurality of branch electrodes into first, second, third and fourth regions arranged along the clockwise direction;

in the first region, one sides of the first main electrode and the second main electrode close to the first region are respectively connected with a plurality of first branch electrodes;

in the second region, one sides of the first main electrode and the second main electrode close to the second region are respectively connected with a plurality of second branch electrodes;

in the third region, one sides of the first main electrode and the second main electrode close to the third region are respectively connected with a plurality of third branch electrodes;

in the fourth region, one sides of the first main electrode and the second main electrode close to the fourth region are respectively connected with a plurality of fourth branch electrodes;

the first, second, third, fourth branch electrodes are respectively tilted of 135°, 45°, −45° and −135° relative to an extending direction of the second main electrode;

wherein, the first main electrode comprises a plurality of first electrode sections, and a plurality of second electrode sections orthogonal with and connected to the first electrode sections end to end;

the second main electrode comprises a plurality of third electrode sections, and a plurality of fourth electrode sections orthogonal with and connected to the third electrode sections end to end, and the third electrode sections and the first electrode sections are parallel, and the fourth electrode sections and the second electrode sections are parallel;

joints of the plurality of the first electrode sections and the plurality of second electrode sections respectively form first bending parts on the first main electrode; joints of the plurality of the third electrode sections and the plurality of fourth electrode sections respectively form second bending parts on the second main electrode;

wherein, a plurality of first, second, third, fourth electrode gaps are formed among the plurality of first, second, third, fourth branch electrodes; widths of the first, second, third, fourth electrode gaps are the same; included angles between the first, second, third, fourth electrode gaps and extending directions of the first main electrode and the second main electrode are 45 degrees;

wherein material of the pixel electrode is ITO.

The present invention further provides a liquid crystal display panel, comprising an upper substrate, a lower substrate oppositely positioned to the upper substrate, a common electrode positioned at one side of the upper substrate facing the lower substrate, a pixel electrode positioned at one side of the lower substrate facing the upper substrate and a liquid crystal layer sandwiched between the common electrode and the pixel electrode;

the lower substrate comprises a plurality of scan lines extending along the horizontal direction, a plurality of data lines extending along the vertical direction and a plurality of TFTs, and gates of the TFTs are coupled to the scan lines, sources are coupled to the data lines, and drains are coupled to the pixel electrode;

the pixel electrode, comprising a first main electrode, and a second main electrode orthogonally cross with the first main electrode, and a plurality of branch electrodes connected with the first main electrode and the second main electrode;

both the first main electrode and the second main electrode appear to be a continuous elbow bend zigzag;

the first main electrode and the second main electrode separate the plurality of branch electrodes into first, second, third and fourth regions arranged along the clockwise direction;

in the first region, one sides of the first main electrode and the second main electrode close to the first region are respectively connected with a plurality of first branch electrodes;

in the second region, one sides of the first main electrode and the second main electrode close to the second region are respectively connected with a plurality of second branch electrodes;

in the third region, one sides of the first main electrode and the second main electrode close to the third region are respectively connected with a plurality of third branch electrodes;

in the fourth region, one sides of the first main electrode and the second main electrode close to the fourth region are respectively connected with a plurality of fourth branch electrodes;

the first, second, third, fourth branch electrodes are respectively tilted of 135°, 45°, −45° and −135° relative to an extending direction of the second main electrode.

The benefits of the present invention are: in the liquid crystal display panel of the present invention, by locating the main parts to be elbow bend zigzag structures to make the liquid crystal molecules of the main electrode position be aligned along a tilt 45 degrees direction as possible, the active area is enlarged to solve the issue that the penetration rate is low because the liquid crystal molecules at the structure of the (cross) keel of pozidriv pixel electrode fall down toward the improper directions, to raise the penetration rate for reducing the demand to the backlight brightness of the liquid crystal display panel and lowering the cost and the usage power consumption. In the liquid crystal display panel of the present invention, of which the main parts of the pixel electrode utilizes the elbow bend zigzag structures, the penetration rate is higher, and the demand to the backlight brightness is lower, and the usage power consumption is lower.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
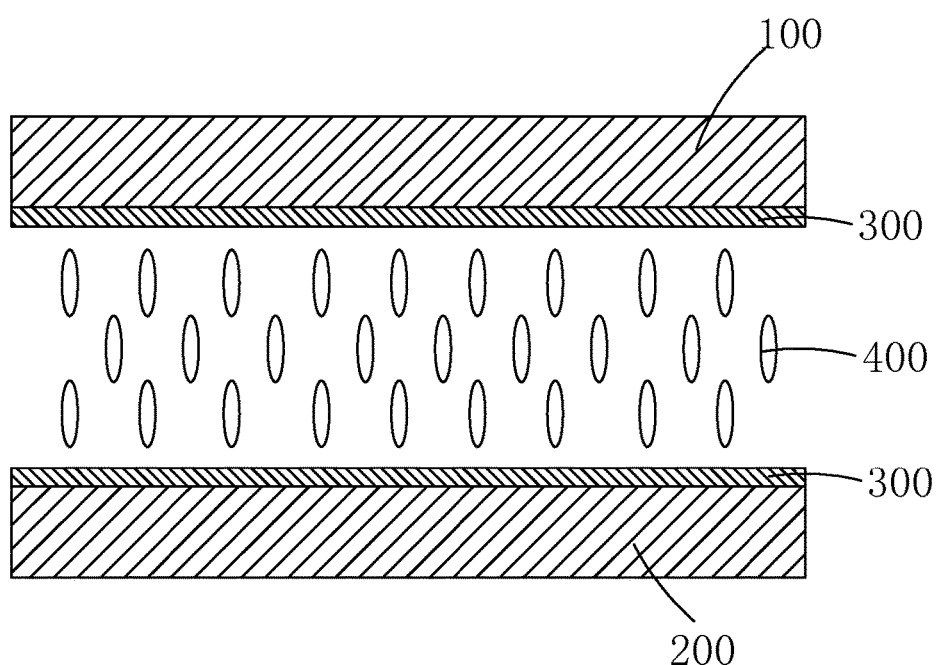
FIG. 1 is a sectional diagram of a VA type liquid crystal display panel according to prior art.
Figure 2:
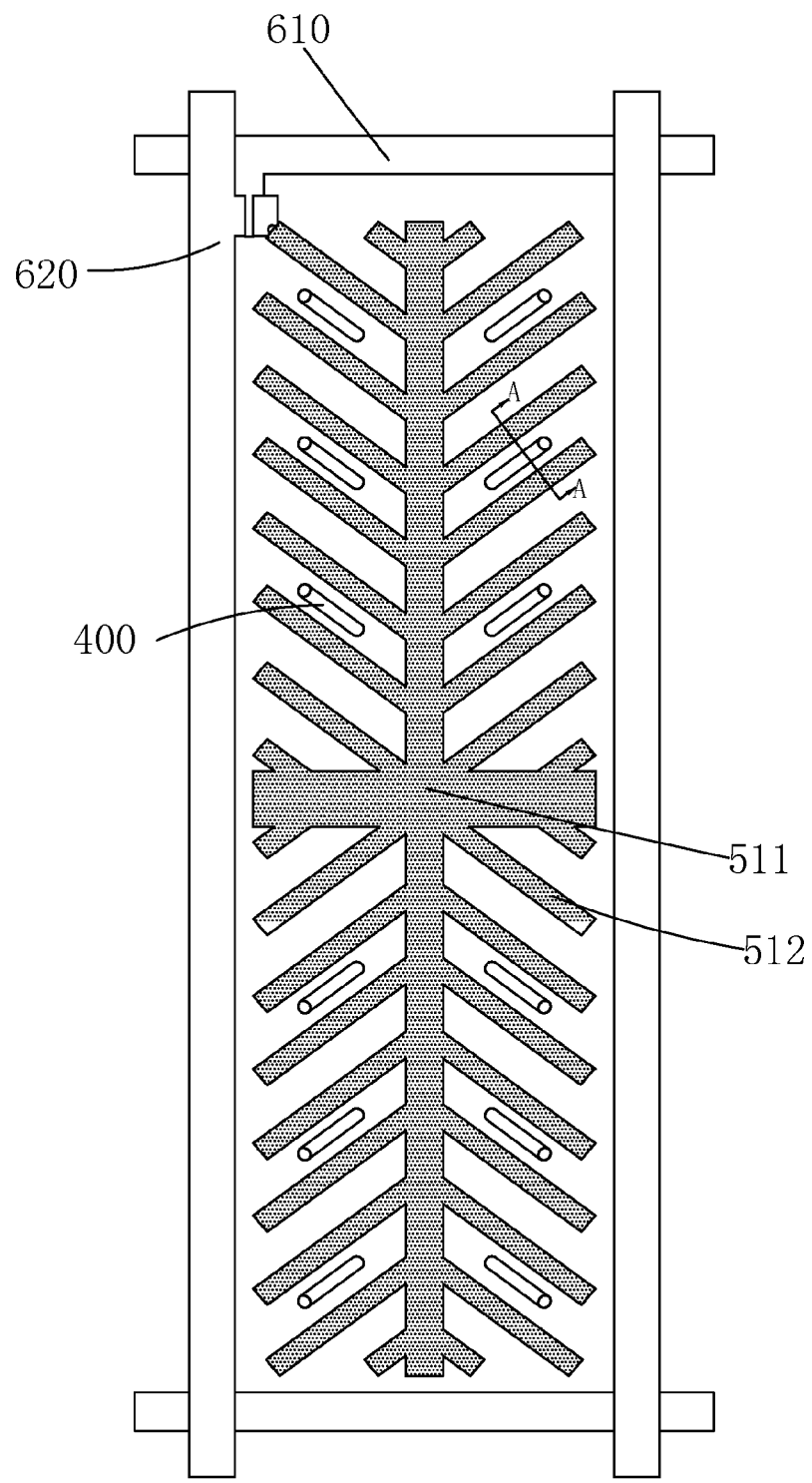
FIG. 2 is a top view diagram of one side of a lower substrate in an MVA type liquid crystal display panel according to prior art.
Figure 3:
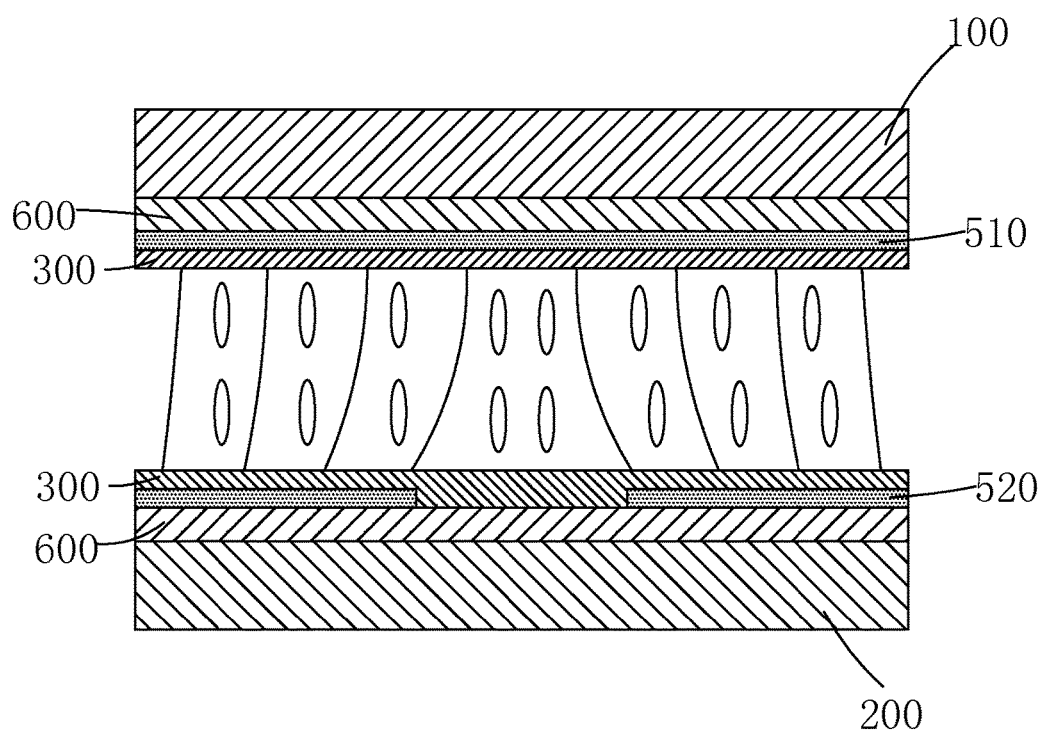
FIG. 3 is a sectional diagram of an MVA type liquid crystal display panel according to prior art corresponding to A-A portion shown in FIG. 2.
Figure 4:
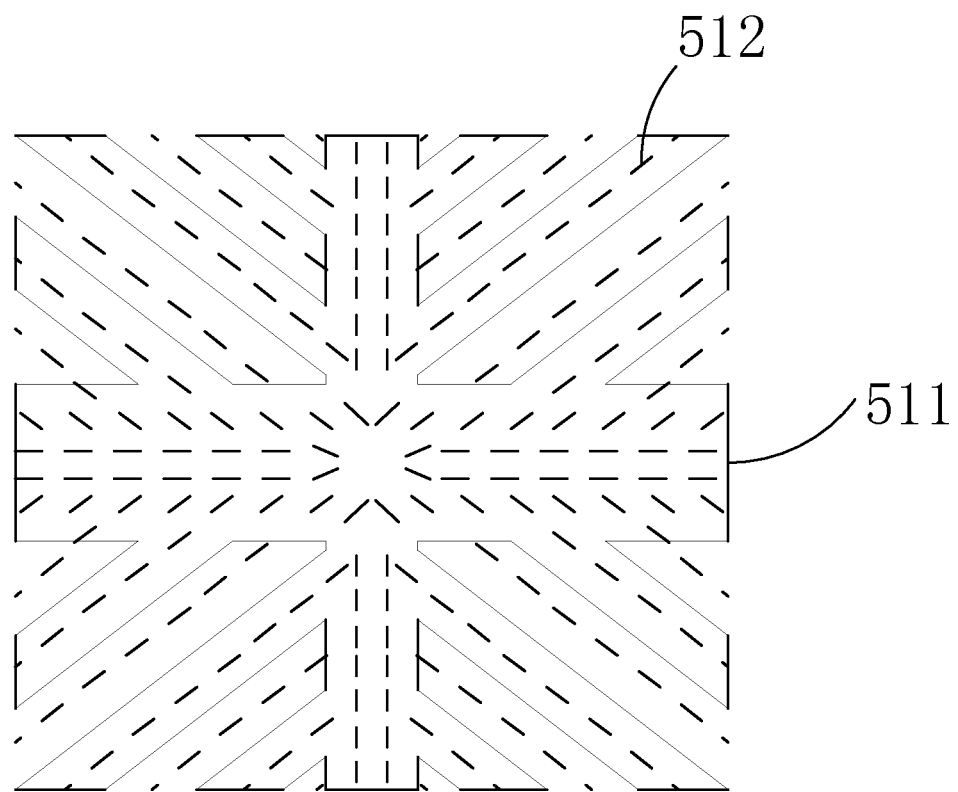
FIG. 4 is a felling direction diagram of liquid crystal molecules in the MVA type liquid crystal display panel shown in FIG. 2.
Figure 5:
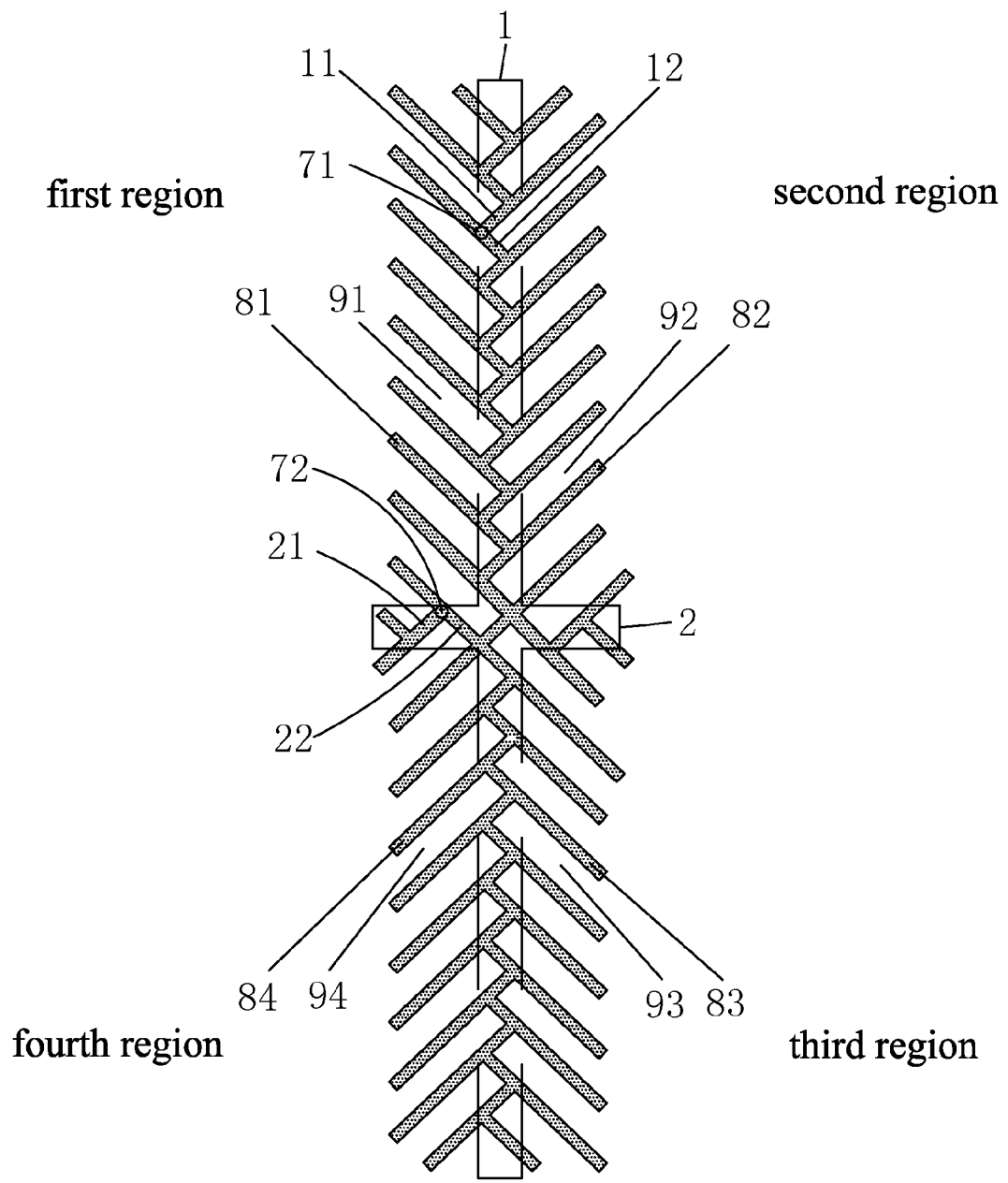
FIG. 5 is a top view diagram of a pixel electrode according to the first embodiment of the present invention.

Please refer to FIG. 5. The present invention first provides a pixel electrode, comprising a first main electrode 1, and a second main electrode 2 orthogonally cross with the first main electrode 1, and a plurality of branch electrodes connected with the first main electrode 1 and the second main electrode 2;

The main part of the pixel electrode according to the present invention is no longer a (cross) keel structure, but both the first main electrode 1 and the second main electrode 2 are set to be elbow bend zigzag structures.

The first main electrode 1 and the second main electrode 2 separate the plurality of branch electrodes into first, second, third and fourth regions arranged along the clockwise direction;

in the first region, one sides of the first main electrode 1 and the second main electrode 2 close to the first region are respectively connected with a plurality of first branch electrodes 81;

in the second region, one sides of the first main electrode 1 and the second main electrode 2 close to the second region are respectively connected with a plurality of second branch electrodes 82;

in the third region, one sides of the first main electrode 1 and the second main electrode 2 close to the third region are respectively connected with a plurality of third branch electrodes 83;

in the fourth region, one sides of the first main electrode 1 and the second main electrode 2 close to the fourth region are respectively connected with a plurality of fourth branch electrodes 84;

the first, second, third, fourth branch electrodes 81, 82, 83, 84 are respectively tilted of 135°, 45°, −45° and −135° relative to an extending direction of the second main electrode 2.

Specifically, the first main electrode 1 comprises a plurality of first electrode sections 11, and a plurality of second electrode sections 12 orthogonal with and connected to the first electrode sections 11 end to end;

the second main electrode 2 comprises a plurality of third electrode sections 21, and a plurality of fourth electrode sections 22 orthogonal with and connected to the third electrode sections 21 end to end, and the third electrode sections 21 and the first electrode sections 11 are parallel, and the fourth electrode sections 22 and the second electrode sections 12 are parallel;

joints of the plurality of the first electrode sections 11 and the plurality of second electrode sections 12 respectively form first bending parts 71 on the first main electrode 1;

joints of the plurality of the third electrode sections 21 and the plurality of fourth electrode sections 22 respectively form second bending parts 72 on the second main electrode 2.

Specifically, in the first embodiment, and in the first region, one sides of the first electrode sections 11, third electrode sections 21 close to the first region are orthogonally connected with one first branch electrode 81, respectively, and the first branch electrode 81 is connected with the first bending part 71 or the second bending part 72;

in the second region, one sides of the second electrode sections 12, fourth electrode sections 22 close to the second region are orthogonally connected with one second branch electrode 82, respectively, and the second branch electrode 82 is connected with the first bending part 71 or the second bending part 72;

in the third region, one sides of the first electrode sections 11, third electrode sections 21 close to the third region are orthogonally connected with one third branch electrode 83, respectively, and the third branch electrode 83 is connected with the first bending part 71 or the second bending part 72;

in the fourth region, one sides of the second electrode sections 12, fourth electrode sections 22 close to the fourth region are orthogonally connected with one fourth branch electrode 84, respectively, and the fourth branch electrode 84 is connected with the first bending part 71 or the second bending part 72.

Furthermore, the first electrode sections 11 of the first main electrode 1 in a middle region are commonly shared with the second main electrode 2, and replace the third electrode sections 21 of the second main electrode 2 in the middle region.

A plurality of first, second, third, fourth electrode gaps 91, 92, 93, 94 are formed among the plurality of first, second, third, fourth branch electrodes 81, 82, 83, 84, and widths of the first, second, third, fourth electrode gaps 91, 92, 93, 94 are the same. Included angles between the first, second, third, fourth electrode gaps 91, 92, 93, 94 and extending directions of the first main electrode 1 and the second main electrode 2 are 45 degrees to ensure that the first, second, third, fourth branch electrodes can be respectively tilted of 135°, 45°, −45° and −135° relative to an extending direction of the second main electrode 2.

Specifically, widths of the first, second, third, fourth electrode sections 81, 82, 83, 84 are the same, and widths of the first, second, third, fourth branch electrodes 11, 12, 21, 22 are the same.

Furthermore, the widths of the first, second, third, fourth electrode sections 81, 82, 83, 84 can be set to be the same as the widths of the first, second, third, fourth branch electrodes 11, 12, 21, 22 are the same. The lengths of the first, second, third, fourth branch electrodes 11, 12, 21, 22 are the same.

Preferably, material of the pixel electrode is ITO.

As the pixel electrode of the present invention is applied in a liquid crystal display panel, the plurality of first, second, third and fourth branch electrodes 81, 82, 83, 84 respectively correspond to four areas of one sub pixel area. As applying voltage to the liquid crystal display panel, because the main part of the pixel electrode of the present invention is not the structure of the (cross) keel but two crossing elbow bend zigzag structures, the active area is enlarged to reduce the issue that the liquid crystal molecules fall down toward the improper directions and to make the liquid crystal molecules in the region corresponding to the original structure of the (cross) keel to be aligned along the direction of 45 degree as more as possible. The liquid crystal molecules in the four regions of one sub pixel respectively fall down with 135°, 45°, −45° and −135° included angles relative to the extending direction of the second main electrode 2, and any of the regions comprises $\sin^2 2\Delta\Phi=1$ and thus, the liquid crystal efficiency is maximized, and the penetration rate is promoted.

Figure 6:
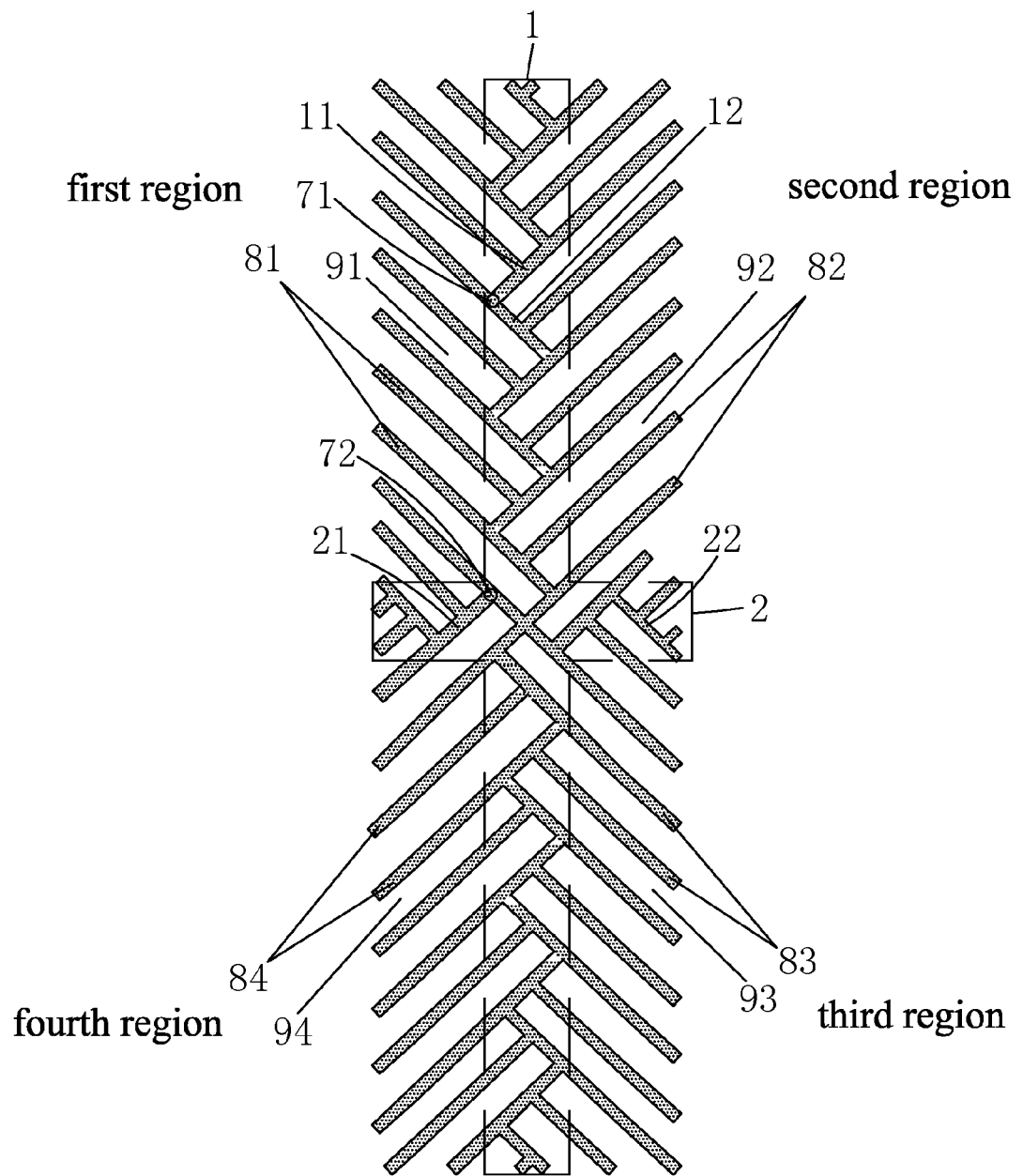
FIG. 6 is a top view diagram of a pixel electrode according to the second embodiment of the present invention.

Please refer to FIG. 6, which is a top view diagram of a pixel electrode according to the second embodiment of the present invention. The difference between the second embodiment and the first embodiment is:

in the first region, one sides of the first electrode sections 11, third electrode sections close 21 to the first region are orthogonally connected with two first branch electrodes 81, respectively, and one of the first branch electrodes 81 is connected with the first bending part 71 or the second bending part 72, and the other is connected with a middle part of the first electrode section 11 or the third electrode section 21.

In the second region, one sides of the second electrode sections 12, fourth electrode sections 22 close to the second region are orthogonally connected with two second branch electrodes 82, respectively, and one of the second branch electrodes 82 is connected with the first bending part 71 or the second bending part 72, and the other is connected with a middle part of the second electrode section 12 or the fourth electrode section 22.

In the third region, one sides of the first electrode sections 11, third electrode sections 21 close to the third region are orthogonally connected with two third branch electrodes 83, respectively, and one of the third branch electrodes 83 is connected with the first bending part 71 or the second bending part 72, and the other is connected with the middle part of the first electrode section 11 or the third electrode section 21.

In the fourth region, one sides of the second electrode sections 12, fourth electrode sections 22 close to the fourth region are orthogonally connected with two fourth branch electrodes 84, respectively, and one of the fourth branch electrodes 84 is connected with the first bending part 71 or the second bending part 72, and the other is connected with a middle part of the second electrode section 12 or the fourth electrode section 22.

Furthermore, the first electrode sections 11 of the first main electrode 1 in a middle region orthogonally cross with the fourth electrode sections 22 of the second main electrode 2 in the middle region, and foot points respectively are middle points of the first electrode sections 11 and the fourth electrode sections 22.

The reset is the same as the first embodiment. The repeated description is omitted here.

As the pixel electrode of the present invention is applied in a liquid crystal display panel, the plurality of first, second, third and fourth branch electrodes 81, 82, 83, 84 respectively correspond to four areas of one sub pixel area. As applying voltage to the liquid crystal display panel, because the main part of the pixel electrode of the present invention is not the structure of the (cross) keel but two crossing elbow bend zigzag structures, the active area is enlarged to reduce the issue that the liquid crystal molecules fall down toward the improper directions and to make the liquid crystal molecules in the region corresponding to the original structure of the (cross) keel to be aligned along the direction of 45 degree as more as possible. The liquid crystal molecules in the four regions of one sub pixel respectively fall down with 135°, 45°, −45° and −135° included angles relative to the extending direction of the second main electrode 2, and any of the regions comprises $\sin^2 2\Delta\Phi=1$ and thus, the liquid crystal efficiency is maximized, and the penetration rate is promoted.

In the aforesaid pixel electrode, by locating the main parts to be elbow bend zigzag structures to make the liquid crystal molecules of the main electrode position be aligned along a tilt 45 degrees direction as possible, the active area is enlarged to solve the issue that the penetration rate is low because the liquid crystal molecules at the structure of the (cross) keel of pozidriv pixel electrode fall down toward the improper directions, to raise the penetration rate for reducing the demand to the backlight brightness of the liquid crystal display panel and lowering the cost and the usage power consumption.

On the basis of the same inventive idea, the present invention further provides a liquid crystal display panel. Please refer to FIGS. 7-9. The present invention provides a liquid crystal display panel, comprising: an upper substrate 10, a lower substrate 20 oppositely positioned to the upper substrate 10, a common electrode 51 positioned at one side of the upper substrate 10 facing the lower substrate 20, a pixel electrode 52 positioned at one side of the lower substrate 20 facing the upper substrate 10 and a liquid crystal layer 40 sandwiched between the common electrode 51 and the pixel electrode 52.

Figure 7:
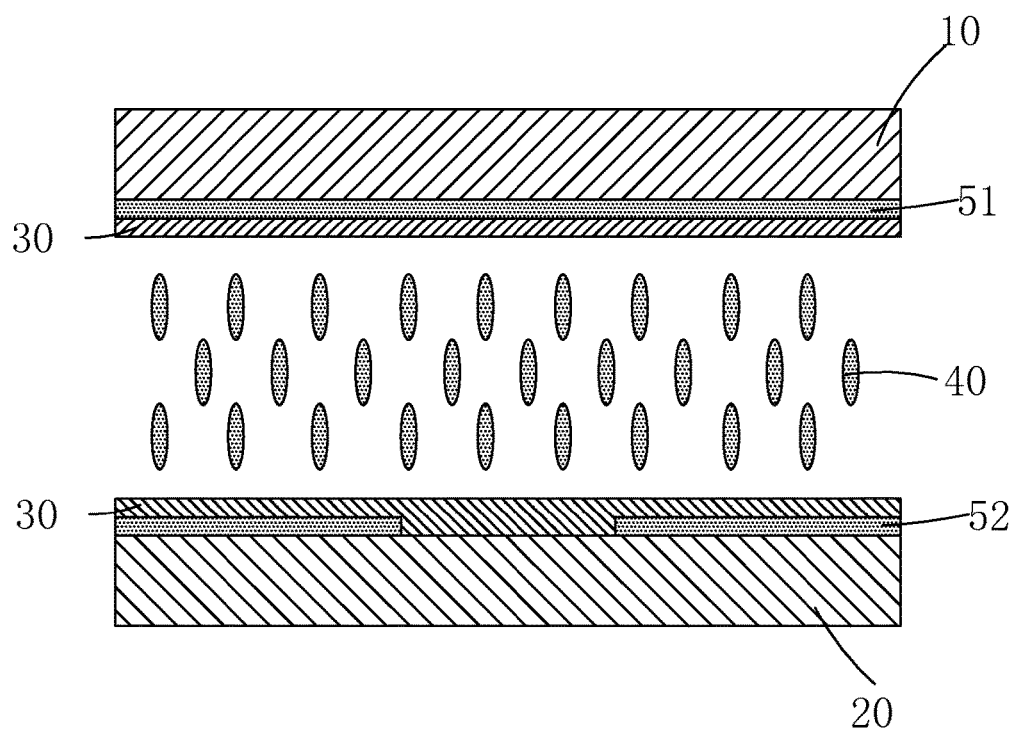
FIG. 7 is a sectional structure diagram of a liquid crystal display panel according to the present invention.

FIG. 7 further shows an alignment layer 30 covering the common electrode 51 and the pixel electrode 52 for implementing alignment to the liquid crystal layer 40. Certainly, it is possible to not to provide the alignment layer 30 but the polymer-stabilized vertical alignment (PSVA) is utilized to implement alignment to the liquid crystal layer 40.

Figure 8:
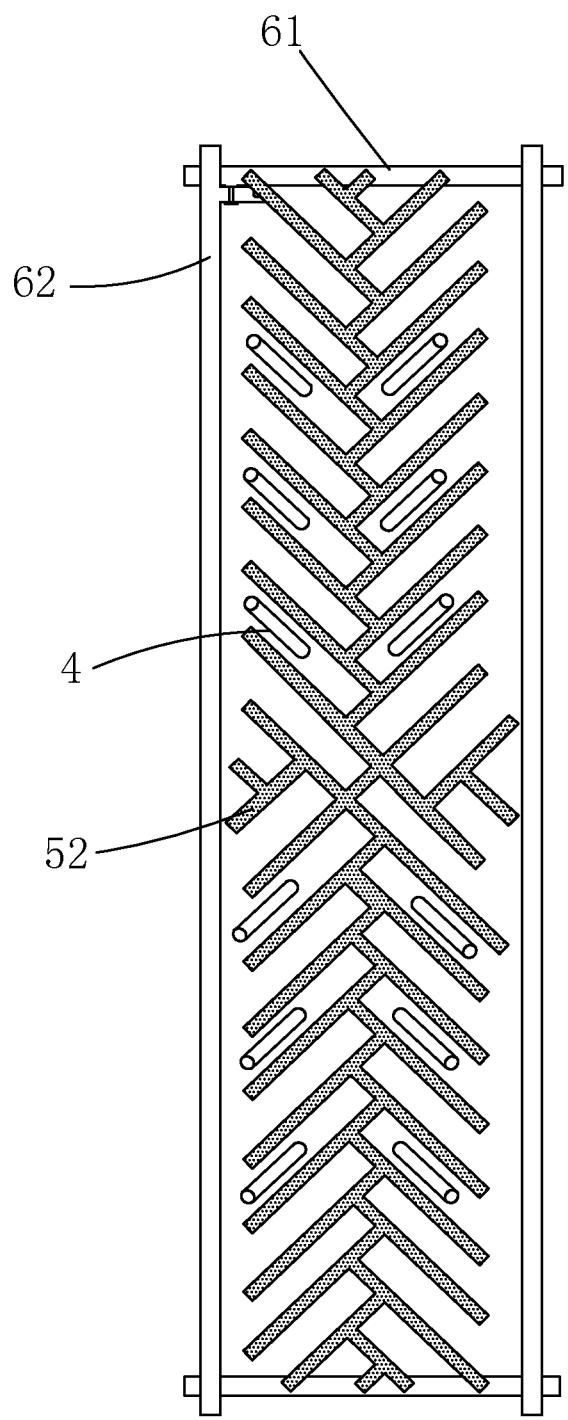
FIG. 8 is a top view diagram of one side of a lower substrate of the first embodiment according to the liquid crystal display panel of the present invention.
Figure 9:
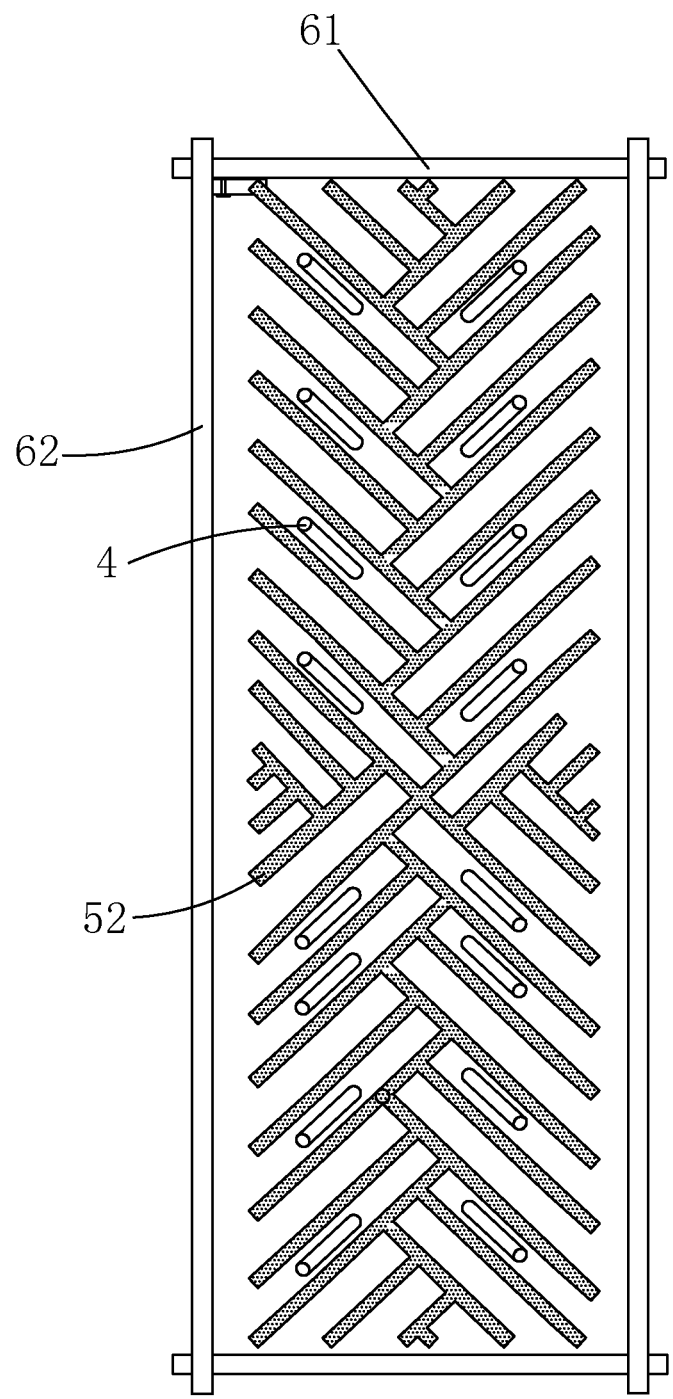
FIG. 9 is a top view diagram of one side of a lower substrate of the second embodiment according to the liquid crystal display panel of the present invention.

Please refer to FIGS. 8-9. The lower substrate 20 comprises a plurality of scan lines 61 extending along the horizontal direction, a plurality of data lines 62 extending along the vertical direction and a plurality of TFTs, and gates of the TFTs are coupled to the scan lines 61, sources are coupled to the data lines 62, and drains are coupled to the pixel electrode 52 through a via hole.

Specifically, referring to FIGS. 5-6, the pixel electrode 52 comprises a first main electrode 1, and a second main electrode 2 orthogonally cross with the first main electrode 1, and a plurality of branch electrodes connected with the first main electrode 1 and the second main electrode 2;

both the first main electrode 1 and the second main electrode 2 appear to be a continuous elbow bend zigzag;

The first main electrode 1 and the second main electrode 2 separate the plurality of branch electrodes into first, second, third and fourth regions arranged along the clockwise direction;

in the first region, one sides of the first main electrode 1 and the second main electrode 2 close to the first region are respectively connected with a plurality of first branch electrodes 81;

in the second region, one sides of the first main electrode 1 and the second main electrode 2 close to the second region are respectively connected with a plurality of second branch electrodes 82;

in the third region, one sides of the first main electrode 1 and the second main electrode 2 close to the third region are respectively connected with a plurality of third branch electrodes 83;

in the fourth region, one sides of the first main electrode 1 and the second main electrode 2 close to the fourth region are respectively connected with a plurality of fourth branch electrodes 84;

the first, second, third, fourth branch electrodes 81, 82, 83, 84 are respectively tilted of 135°, 45°, −45° and −135° relative to an extending direction of the second main electrode 2.

Please refer from FIG. 8 to FIG. 9. The pixel electrode 52 at one side of the lower substrate 20 can utilize any one structure of the first and second embodiment of the aforesaid pixel electrode (as shown in FIG. 5 and FIG. 6). The repeated description is omitted here.

As the pixel electrode of the present invention is applied in a liquid crystal display panel, the plurality of first, second, third and fourth branch electrodes 81, 82, 83, 84 respectively correspond to four areas of one sub pixel area. As applying voltage to the liquid crystal display panel, because the main part of the pixel electrode of the present invention is not the structure of the (cross) keel but two crossing elbow bend zigzag structures, the active area is enlarged to reduce the issue that the liquid crystal molecules fall down toward the improper directions and to make the liquid crystal molecules in the region corresponding to the original structure of the (cross) keel to be aligned along the direction of 45 degree as more as possible. The liquid crystal molecules in the four regions of one sub pixel respectively fall down with 135°, 45°, −45° and −135° included angles relative to the extending direction of the second main electrode 2, and any of the regions comprises $\sin^2 2\Delta\Phi=1$ and thus, the liquid crystal efficiency is maximized, and the penetration rate is promoted.

In the aforesaid liquid crystal display panel, of which the main parts of the pixel electrode utilizes the elbow bend zigzag structures, the penetration rate is higher, and the demand to the backlight brightness is lower, and the usage power consumption is lower.

In conclusion, in the liquid crystal display panel of the present invention, by locating the main parts to be elbow bend zigzag structures to make the liquid crystal molecules of the main electrode position be aligned along a tilt 45 degrees direction as possible, the active area is enlarged to solve the issue that the penetration rate is low because the liquid crystal molecules at the structure of the (cross) keel of pozidriv pixel electrode fall down toward the improper directions, to raise the penetration rate for reducing the demand to the backlight brightness of the liquid crystal display panel and lowering the cost and the usage power consumption. In the liquid crystal display panel of the present invention, the pixel electrode thereof utilizes the structure not including the (cross) keel, and the penetration rate is higher, and the demand to the backlight brightness is lower, and the usage power consumption is lower.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A pixel electrode, comprising a first main electrode, and a second main electrode orthogonally cross with the first main electrode, and a plurality of branch electrodes connected with the first main electrode and the second main electrode;

both the first main electrode and the second main electrode appear to be a continuous elbow bend zigzag;

the first main electrode and the second main electrode separate the plurality of branch electrodes into first, second, third and fourth regions arranged along the clockwise direction;

in the first region, one sides of the first main electrode and the second main electrode close to the first region are respectively connected with a plurality of first branch electrodes;

in the second region, one sides of the first main electrode and the second main electrode close to the second region are respectively connected with a plurality of second branch electrodes;

in the third region, one sides of the first main electrode and the second main electrode close to the third region are respectively connected with a plurality of third branch electrodes;

in the fourth region, one sides of the first main electrode and the second main electrode close to the fourth region are respectively connected with a plurality of fourth branch electrodes;

the first, second, third, fourth branch electrodes are respectively tilted of 135°, 45°, −45° and −135° relative to an extending direction of the second main electrode, wherein, the first main electrode comprises a plurality of first electrode sections, and a plurality of second electrode sections orthogonal with and connected to the first electrode sections end to end;

the second main electrode comprises a plurality of third electrode sections, and a plurality of fourth electrode sections orthogonal with and connected to the third electrode sections end to end, and the third electrode sections and the first electrode sections are parallel, and the fourth electrode sections and the second electrode sections are parallel;

joints of the plurality of the first electrode sections and the plurality of second electrode sections respectively form first bending parts on the first main electrode; joints of the plurality of the third electrode sections and the plurality of fourth electrode sections respectively form second bending parts on the second main electrode, wherein, in the first region, one sides of the first electrode sections, third electrode sections close to the first region are orthogonally connected with two first branch electrodes, respectively, and one of the first branch electrodes is connected with the first bending part or the second bending part, and the other is connected with a middle part of the first electrode section or the third electrode section;

in the second region, one sides of the second electrode sections, fourth electrode sections close to the second region are orthogonally connected with two second branch electrodes, respectively, and one of the second branch electrodes is connected with the first bending part or the second bending part, and the other is connected with a middle part of the second electrode section or the fourth electrode section;

in the third region, one sides of the first electrode sections, third electrode sections close to the third region are orthogonally connected with two third branch electrodes, respectively, and one of the third branch electrodes is connected with the first bending part or the second bending part, and the other is connected with the middle part of the first electrode section or the third electrode section;

in the fourth region, one sides of the second electrode sections, fourth electrode sections close to the fourth region are orthogonally connected with two fourth branch electrodes, respectively, and one of the fourth branch electrodes is connected with the first bending part or the second bending part, and the other is connected with a middle part of the second electrode section or the fourth electrode section.

2. The pixel electrode according to claim 1, wherein the first electrode sections of the first main electrode in a middle region orthogonally cross with the fourth electrode sections of the second main electrode in the middle region, and foot points respectively are middle points of the first electrode sections and the fourth electrode sections.

3. A pixel electrode, comprising a first main electrode, and a second main electrode orthogonally cross with the first main electrode, and a plurality of branch electrodes connected with the first main electrode and the second main electrode;
- both the first main electrode and the second main electrode appear to be a continuous elbow bend zigzag;
- the first main electrode and the second main electrode separate the plurality of branch electrodes into first, second, third and fourth regions arranged along the clockwise direction;
- in the first region, one sides of the first main electrode and the second main electrode close to the first region are respectively connected with a plurality of first branch electrodes;
- in the second region, one sides of the first main electrode and the second main electrode close to the second region are respectively connected with a plurality of second branch electrodes;
- in the third region, one sides of the first main electrode and the second main electrode close to the third region are respectively connected with a plurality of third branch electrodes;
- in the fourth region, one sides of the first main electrode and the second main electrode close to the fourth region are respectively connected with a plurality of fourth branch electrodes;
- the first, second, third, fourth branch electrodes are respectively tilted of 135°, 45°, −45° and −135° relative to an extending direction of the second main electrode;

wherein,
- the first main electrode comprises a plurality of first electrode sections, and a plurality of second electrode sections orthogonal with and connected to the first electrode sections end to end;
- the second main electrode comprises a plurality of third electrode sections, and a plurality of fourth electrode sections orthogonal with and connected to the third electrode sections end to end, and the third electrode sections and the first electrode sections are parallel, and the fourth electrode sections and the second electrode sections are parallel;
- joints of the plurality of the first electrode sections and the plurality of second electrode sections respectively form first bending parts on the first main electrode; joints of the plurality of the third electrode sections and the plurality of fourth electrode sections respectively form second bending parts on the second main electrode;
- wherein, a plurality of first, second, third, fourth electrode gaps are formed among the plurality of first, second, third, fourth branch electrodes; widths of the first, second, third, fourth electrode gaps are the same; included angles between the first, second, third, fourth electrode gaps and extending directions of the first main electrode and the second main electrode are 45 degrees;

wherein material of the pixel electrode is ITO, wherein,
- in the first region, one sides of the first electrode sections, third electrode sections close to the first region are orthogonally connected with two first branch electrodes, respectively, and one of the first branch electrodes is connected with the first bending part or the second bending part, and the other is connected with a middle part of the first electrode section or the third electrode section;
- in the second region, one sides of the second electrode sections, fourth electrode sections close to the second region are orthogonally connected with two second branch electrodes, respectively, and one of the second branch electrodes is connected with the first bending part or the second bending part, and the other is connected with a middle part of the second electrode section or the fourth electrode section;
- in the third region, one sides of the first electrode sections, third electrode sections close to the third region are orthogonally connected with two third branch electrodes, respectively, and one of the third branch electrodes is connected with the first bending part or the second bending part, and the other is connected with the middle part of the first electrode section or the third electrode section;
- in the fourth region, one sides of the second electrode sections, fourth electrode sections close to the fourth region are orthogonally connected with two fourth branch electrodes, respectively, and one of the fourth branch electrodes is connected with the first bending part or the second bending part, and the other is connected with a middle part of the second electrode section or the fourth electrode section.

4. The pixel electrode according to claim 3, wherein the first electrode sections of the first main electrode in a middle region orthogonally cross with the fourth electrode sections of the second main electrode in the middle region, and foot points respectively are middle points of the first electrode sections and the fourth electrode sections.

* * * * *